United States Patent [19]  
Ogawa et al.

[11] Patent Number: 4,737,916  
[45] Date of Patent: Apr. 12, 1988

[54] ELECTRONIC MAP DISPLAY SYSTEM

[75] Inventors: Michima Ogawa; Masaki Yamamoto, both of Nagoya; Kunihiro Ishikawa; Kenzo Ito, both of Okazaki, all of Japan

[73] Assignee: Nippondenso Co., Ltd., Kariya, Japan

[21] Appl. No.: 857,174

[22] Filed: Apr. 29, 1986

[30] Foreign Application Priority Data

Apr. 30, 1985 [JP] Japan ................................ 60-94616

[51] Int. Cl.$^4$ .............................................. G06F 15/50
[52] U.S. Cl. ..................................... 364/443; 364/449; 364/521; 340/990; 340/995; 73/178 R
[58] Field of Search ............... 364/424, 443, 444, 449, 364/521; 342/450–453; 340/988, 990, 995; 73/178 R

[56] References Cited

U.S. PATENT DOCUMENTS

| 4,543,572 | 9/1985 | Tanaka et al. | 364/449 |
| 4,571,684 | 2/1986 | Takanabe et al. | 340/995 |
| 4,608,656 | 8/1986 | Tanaka et al. | 364/449 |
| 4,646,089 | 2/1987 | Takanabe et al. | 340/995 |

Primary Examiner—Gary Chin  
Attorney, Agent, or Firm—Cushman, Darby & Cushman

[57] ABSTRACT

A novel electronic map display system is disclosed for displaying a map on the basis of a map data stored. Various discontinuous points in each of predetermined areas included a map to be displayed are stored as structured data in the form of vectors. The discontinuous geographic data in each of the areas is stored as image pattern data. A selection signal is produced from a display selection unit for selecting an area to be displayed from the map. In accordance with the selection signal, a display signal is generated from the pattern data and the structured data corresponding to the area to be displayed. A map of the particular area is displayed on the basis of the display signal of a display control unit.

5 Claims, 17 Drawing Sheets

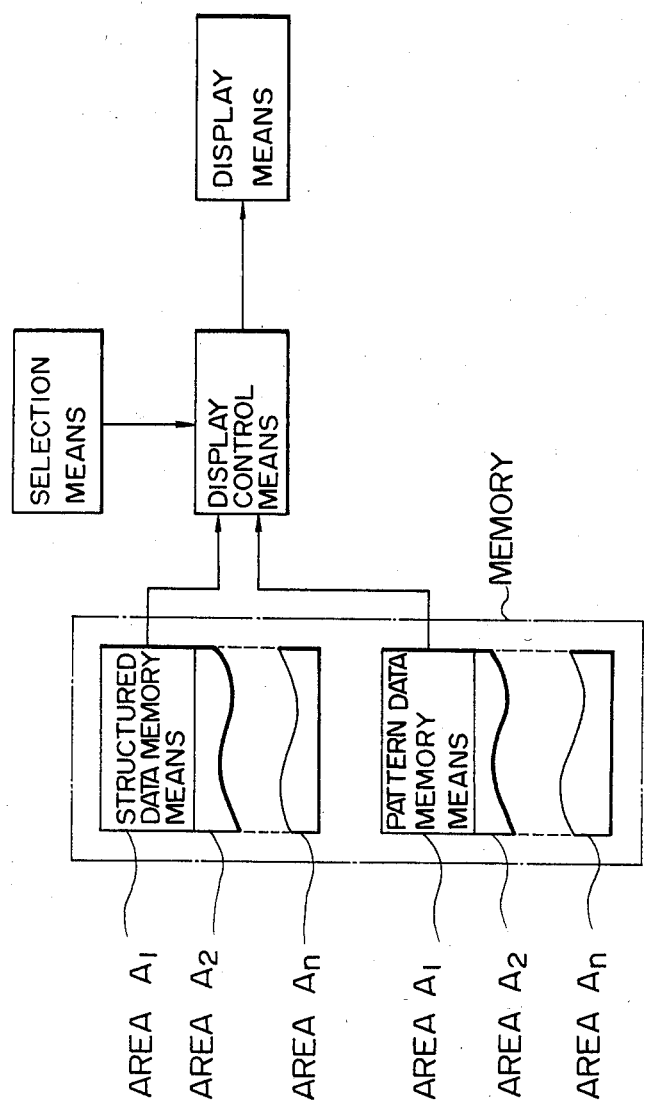

|  (X₂,Y₂) | O | I | II | III | IV | V | VI | VII | VIII |
|---|---|---|---|---|---|---|---|---|---|
| O | × | × | × | × | O | O | × | O | O |
| I | × | × | × | O | O | O | O | O | O |
| II | × | × | × | O | O | × | O | O | × |
| III | × | O | O | × | O | O | × | O | O |
| IV | O | O | O | O | O | O | O | O | O |
| V | O | O | × | O | O | × | O | O | × |
| VI | × | O | O | × | O | O | × | × | × |
| VII | O | O | O | O | O | O | × | × | × |
| VIII | O | O | × | O | O | × | × | × | × |

F I G. 9a
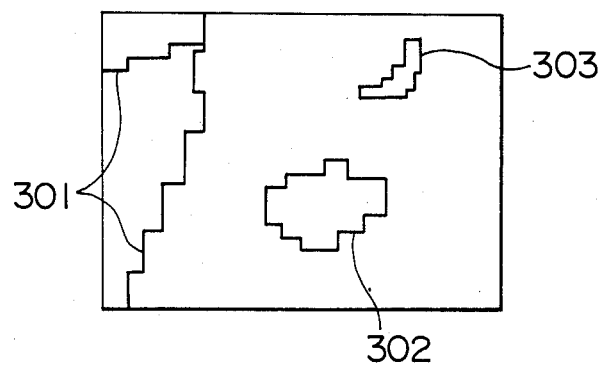
F I G. 9b
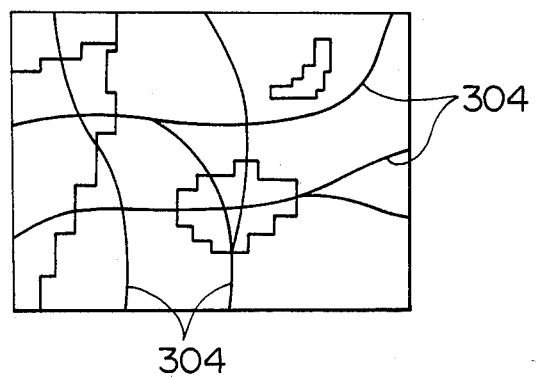

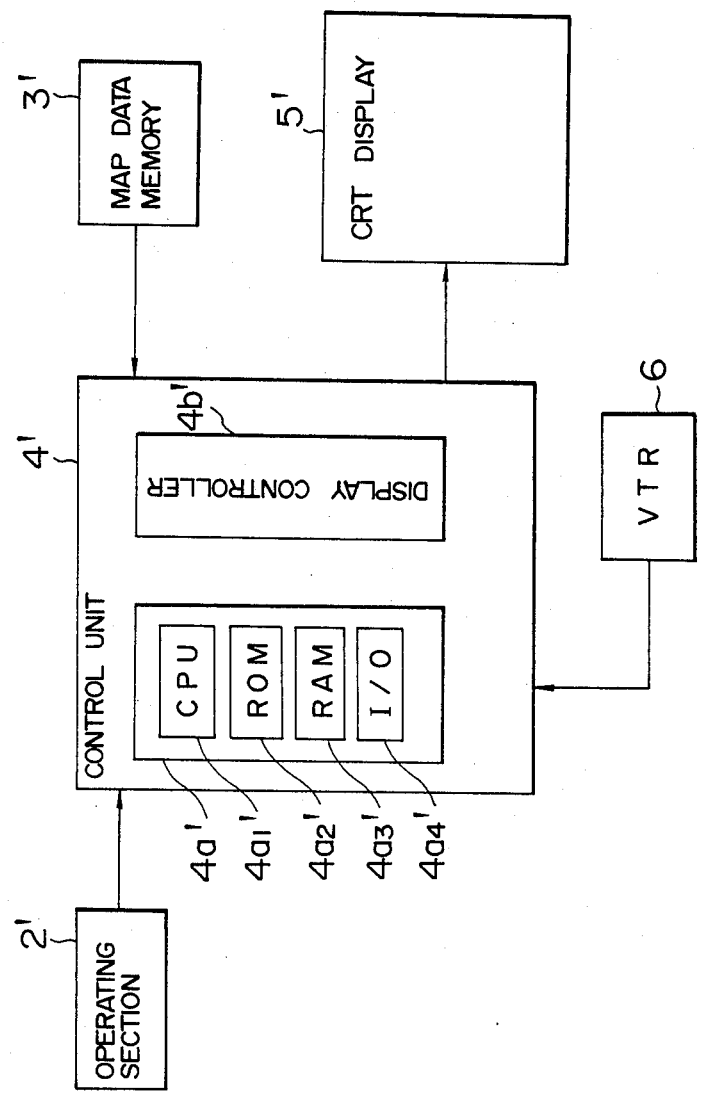

ELECTRONIC MAP DISPLAY SYSTEM

BACKGROUND OF THE INVENTION

The present invention relates to an electronic map display system for visually displaying map data stored, or more in particular to an electronic map display system suitable for use on an automobile or the like.

A conventional device called an electronic map display system has been suggested in the art. Using this device, necessary map can be rapidly searched for is used by the automobile driver to enable him to reach his destination.

In such a system, required map data on given areas are stored in a large-capacity memory means such as a magnetic disc or optical disc, and by designating the area around the automobile with a select switch or the like, the map thereof is displayed on a CRT or the like device.

Data memory means for this display has so far been limited generally to an image pattern system, in which images of maps are stored. A map image, for example, is subdivided and each divided unit is stored in an arrangement corresponding to the particular map coordinate as digital data.

Using such an electronic map display system, it is no longer necessary to carry any map while driving, and a required place can be easily searched for.

The above-mentioned image pattern system stores all the points on a map. Since a very great amount of memory areas is required, either the memory medium is required to be enlarged or the storage amount is required to be decreased by limiting the display.

Another disadvantage of the image pattern system is that the construction of the map elements cannot be identified and it becomes very difficult to change the form in which the contents of the map will be displayed by data conversion, so that it is necessary to store the data on the whole screen for each form of expression including enlargement, reduction, resolution or color.

Further, the problem is that the change or correction of a part of the data requires replacement of the whole data.

SUMMARY OF THE INVENTION

The present invention has been completed with the object of facilitating the reduction in storage capacity, conversion of the expression form and change or correction of the data.

According to the present invention, there is provided an electronic map display system for displaying a map on the basis of map data stored, comprising a structured data memory for storing each discontinuous geographic point as a vetorial data in each of a plurality of predetermined areas making up a map to be displayed, a pattern data memory for storing continuous geographic data as an image pattern data in each of the predetermined areas, a display selector for producing a select signal for selectihg an area to be displayed from the map, display control means for generating a display signal from the structured data and the pattern data corresponding to the predetermined area to be displayed, in accordance with the select signal, and display means for displaying a map of the area to be displayed, on the basis of the display signal of the display control means.

According to the present invention, structured data and image pattern data are combined to provide map data. Therefore, display can be effected rapidly on the one hand, and if various expression forms are desired, the expression form can be changed easily with a small storage capacity on the other hand. Further, if the road data is stored as structured data, and the other background data as image pattern data, the most important roads can be clearly distinguished from the background on the display. Furthermore, other detailed information can be inserted into the background, thereby adding utilitarian function to the screen.

BRIEF DESCRIPTION OF THE DRAWINGS

FIG. 1 is a block diagram showing the basic configuration of the present invention.

FIG. 5b-1 and 5b-2 are flowcharts for computing and processing by selecting required data from the structured data strings.

FIG. 9(a) is a diagram for explaining the screen exclusive to the image pattern data.

FIG. 9(b) is a diagram for explaining a combined screen of the image pattern data and the structured data.

FIG. 13 is a block diagram showing an embodiment with a VTR.

DESCRIPTION OF THE PREFERRED EMBODIMENTS

An embodiment of the electronic map display system according to the present invention will be explained below with reference to the attached drawings of FIG. 2 and so on.

Figure 2:
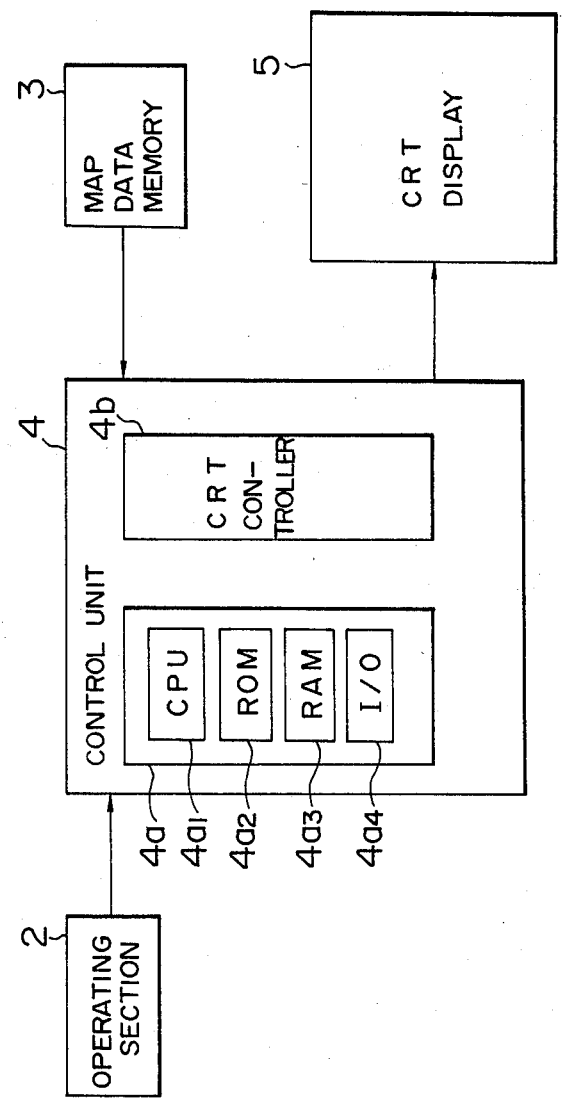
FIG. 2 is a block diagram showing an embodiment of the present invention.

FIG. 2 shows a block diagram of the embodiment under consideration. In FIG. 2, reference numeral 2 designates an operating section having the function as display content designation means M4, which is operated by the driver or the like in using the electronic map display system. Numeral 3 designates a map data memory, having first memory means M2 and second memory means M3 for storing predetermined map data in advance. Numeral 4 designates a control unit including a microcomputer having a CPU 4$a$1, a ROM 4$a$2, a RAM 4$a$3 and an I/O 4$a$4 partially having the function of the display control means M7, first data selection means M5 and second data selection means M6, and a display controller 4$b$ partially having the function of the display control means M7 for functional execution of the computing process and display control. Numeral 5 designates a CRT display as a visual display means M1.

The operating section 2 includes a selection key for selecting an area to be displayed, an enlargement key for giving an instruction to enlarge the map on the display, that is, the presently-displayed map by one rank, a reduction key for reducing the presently-displayed map by one rank, a coarse key for roughening the presently-displayed map by one rank and a dense key for increasing the density (or reducing the scale) of the presently-displayed map.

The RAM 4$a$3 of the microcomputer 4$a$ of the control unit 4 is provided with a video RAM (VRAM) region for direct indication of the display content on the CRT display 5. The display controller 4$b$ makes a direct access to this VRAM region and displays the content thereof in a one-to-one ratio on the CRT 5. Also, a separate VRAM region for character data is provided to display characters corresponding to the code written in the VRAM on the CRT display 5.

The map data memory 3 includes an optical disc memory means for storing map data digitally in an optical disc. The data are read by a laser beam as immediately as required, and sent to and processed by the control unit 4.

Figure 3A:
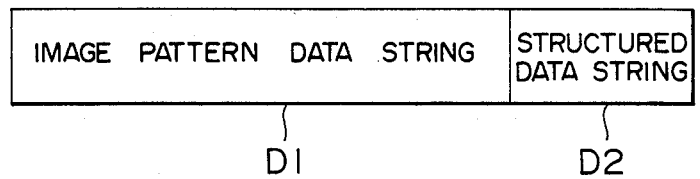
FIG. 3(a) is a diagram showing a memory structure in a memory means.
Figure 3B:
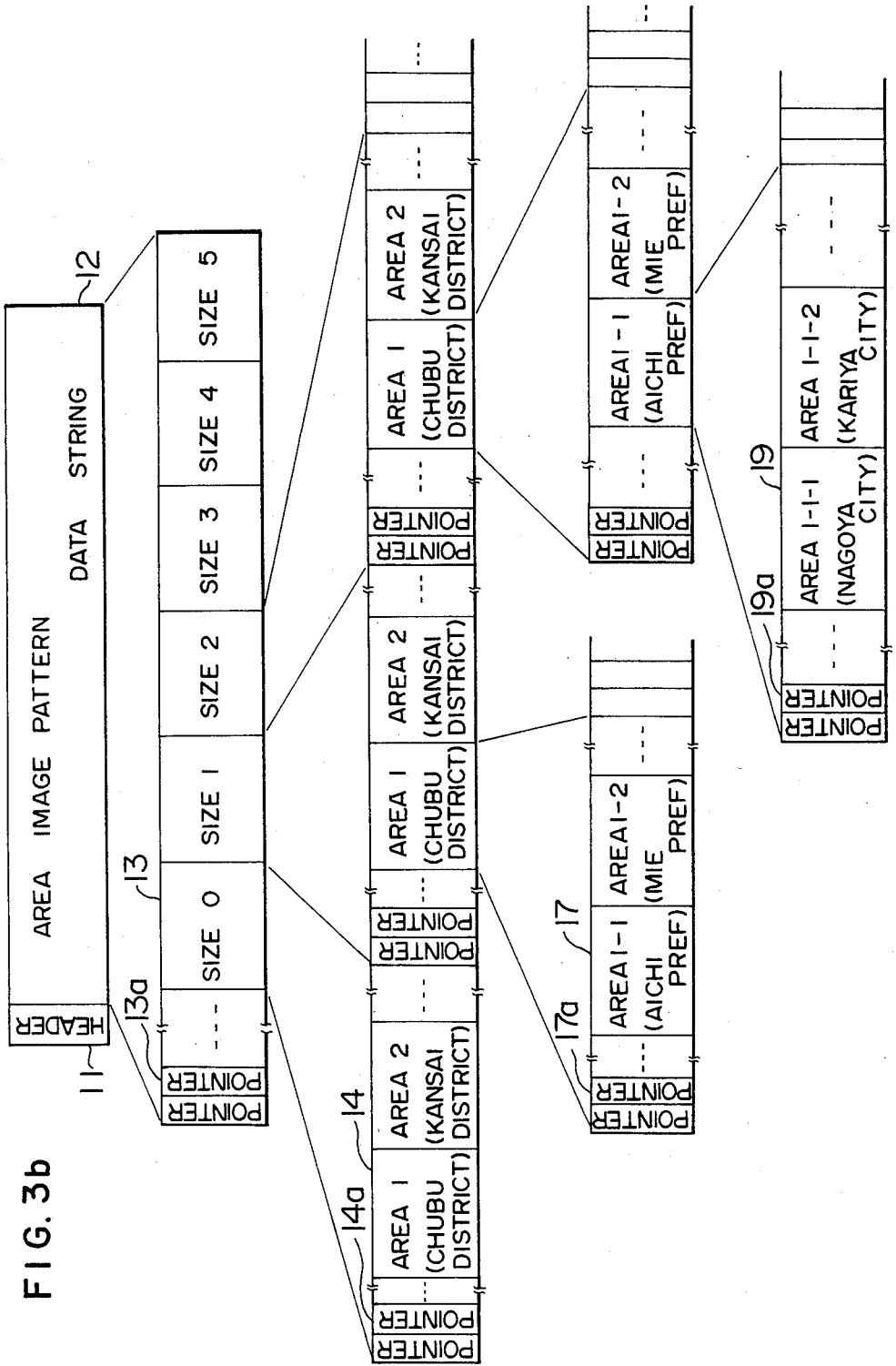
FIG. 3(b) is a diagram showing a memory structure of an image pattern data string therein.
Figure 3C:
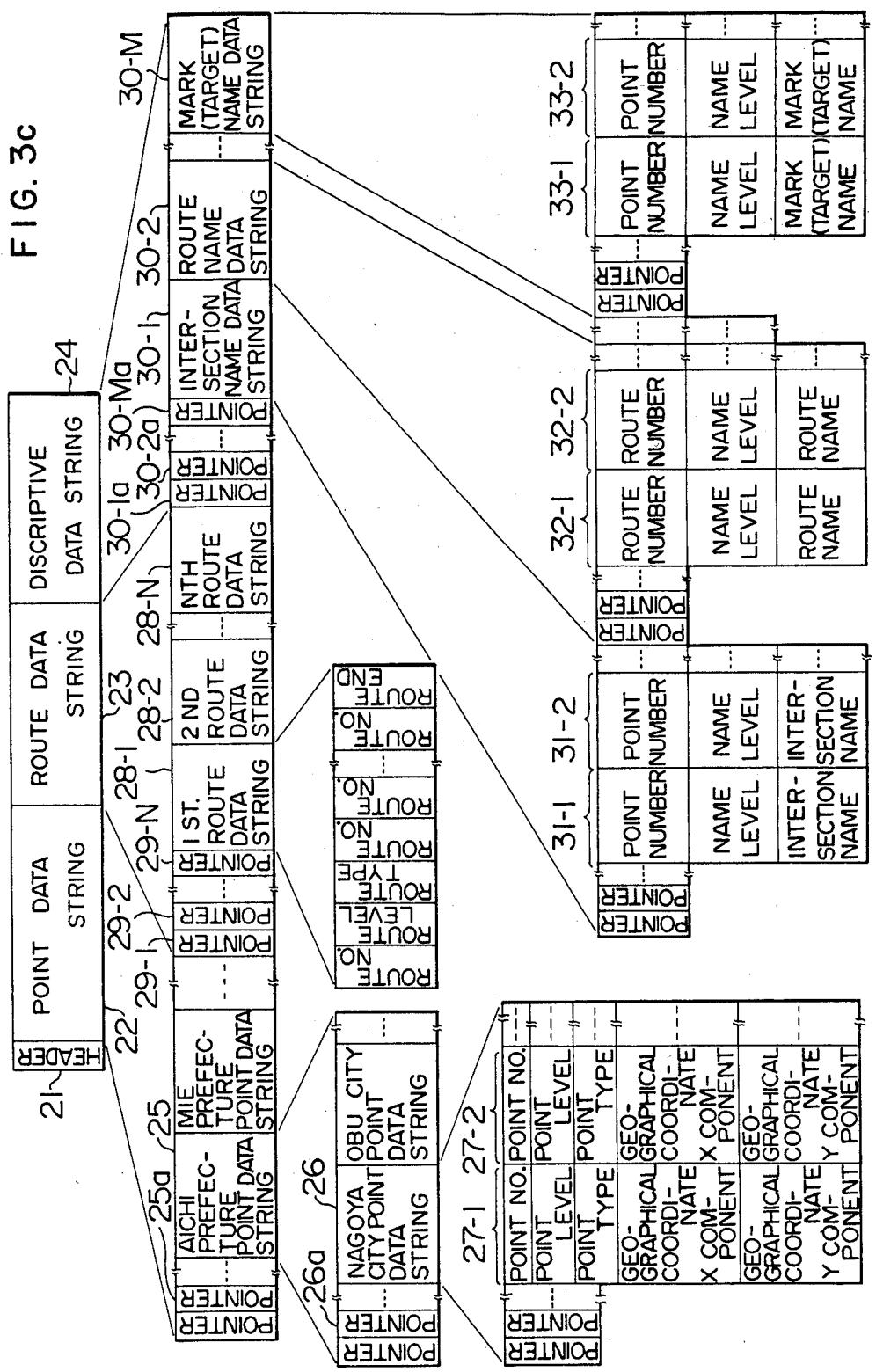
FIG. 3(c) is a diagram showing a memory structure of a structured data string therein.

The data stored in this optical disc, as shown in FIG. 3($a$), includes structured data D2 to be stored in the first memory means M2 and image pattern data D1 to be stored in the second memory means M3.

The image pattern data D1, as shown in FIG. 3($b$), for instance, includes a header 11 and an area iamge pattern string 12 providing an identification code for the area image pattern map data. The area image pattern data string 12 includes a size data string 13 by size (such as one millionth or one 25000th in scale) of the map to be displayed. The head of each data string 13 corresponds one-to-one to each data and is stored with a pointer 13$a$ for recording each data start address.

Of all these data, the most-reduced one (such as to one millionth) includes an area data string 14 representing a large area such as Chubu District, and the head of the data string 14 corresponds one-to-one to each area, being stored with a pointer 14$a$ for recording each data start address. In the case of a display of this size 0, the image pattern data is read from the area data string 14.

The size 1, which is the second most-reduced data (such as to 500 thousandth), on the other hand, is classified for the first stage in a manner similar to the size 0. Each area data, however, is subdivided into further detail so that each area data includes a prefectural data string 17 representing a narrow area such Aichi Prefecture. The head of each data string 17 corresponds one-to-one to each prefecture, and is stored with a pointer 17$a$ for recording the prefectural data start address. In the case of display of this size 1, the image pattern data is read from the prefectural data string 17.

Now, reference is made to size 2, that is, the third most-reduced data (such as to 250 thousandth). First, the first stage thereof is classified in a manner similar to the size 0, and the second stage in a manner similar to size 1. The data, however, is further subdivided for each prefecture, so that each prefectural data is comprised of a city data string 19 representing a smaller area such as Nagoya City. The head of the data string 19 corresponds one-to-one to each city and is stored with a pointer 19$a$ for recording the city data start address. In the case of display of this size 2, the image pattern is read from the city data string 19.

For other sizes 3 to 5, also, an image pattern of areas subdivided in further details in stages are stored.

The control unit 4 searches for the location of an image pattern data from the header 11, searches for the header address of a required size by way of the pointer 13$a$, and reads from the memory means 3 and writes into the VRAM the image pattern data of a required area by way of the pointers 14$a$, 17$a$, 19$a$, etc.

The structured data D2, on the other hand, includes, as shown in FIG. 3($c$), a header 21 providing an identification code for the area structured map data, an area data string 22 relating to such points as main intersections, a route data string 23 relating to the routes such as the national roads, and a descriptive data string 24 relating to various services. The geographical point data 22 includes prefectural point data strings 25 for the particular area such as the Aichi prefectural point data string relating to Aichi Prefecture and a pointer 25$a$ thereof. Of all the prefectural point data strings, the Aichi prefectural point data string, for instance, includes city point data strings 26 for a particular prefecture such as Nagoya city point data string relating to Nagoya City belonging to Aichi Prefecture and a pointer 26$a$ thereof. Of all the city point data strings 26, on the other hand, the Nagoya city point data string, for instance, has a point data group including point data 27-1, 27-2, and so on for the main geographic points of Nagoya City. Each of the point data 27-1, 27-2 and so on, by contrast, includes data indicative thereof, including a point number, a point level, a point type, and X and Y components of the geographical coordinate of the particular point. The route data string 23 includes the No. 1 route data string 28-1, the No. 2 route data string 28-2 and so on to No. N route data string 28-N, and pointers 29-1, 29-2, and so on to 29-N corresponding one-to-one to the route data strings. Each of the route data strings 28-1, 28-2, . . . , 28-N a route number, a route level, a route type, point numbers of the points making up the route, and a route end identification data. The descriptive data string 24, on the other hand, includes intersection name data string 30-1, a route name data string 30-2, and so on to a mark name data string 30-M, and pointers 30-1$a$, 30-2$a$, . . . , 30-M$a$ corresponding one-to-one to the name data strings 30-1, 30-2, . . . , 30-M. The intersection name data string 30-1 includes intersection data group having a point number, a name level, and an intersection name in the form of the intersection data 31-1, 31-2, and so on. The route name data string 30-2 includes a route data group having route data 32-1, 32-2 and so on with a route number, a name level and a route name. The mark name data string 30-M, on the other hand, includes a mark data group having mark data 33-1, 33-2 and so on having a mark name, a point number and a name level.

In the foregoing, the route type represents the type of a particular route such as a national road, a free way, an ordinary road, a railway or a coast line. The point type, on the other hand, represents the type of a particular point such as a general intersection, a grade separation of general roads, an interchange, an intersection of a general road and a free way, or an intersection of a general road and a railway.

Now, the process executed in the control unit 4 will be explained with reference to the flowchart of FIG. 4.

Initially, variables, flags and the like are cleared or set to the initial values at the step 101. Then, at the step 102, it is determined whether an input "Set the display" has been applied from the operating section 2 or not. If there is no such input, a loop is entered to wait for such an input.

If there is the input applied for display setting, the process transfers to the step 103 where a menu for display area selection is displayed and a signal is applied from the operating section 2 for the menu. The menu, for instance, is indicated in the form of the DISTRICT, PREFECTURE, CITY and so on in that order, so as to allow selection thereof in the same order.

Next, the process passes to the step 104, where the image pattern data of the area corresponding to the input from the operating section 2 is read from the memory 3. Next, at the step 105, the data is directly written in the VRAM.

In the process, the content read by the display controller 4b from the VRAM and displayed on the CRT 5 is a map lacking the display of roads. Instead, administrative boundaries, rivers, coast lines, golf courses and the like are displayed. This condition continues only for a moment.

Next, the step 106 inputs the structured data of the area corresponding to the input of the operating section 2. The step 107 then converts the structured data into the data to be written on the VRAM. Specifically, if data only for the reference points are involved, the positions indicated in a predetermined coordinate system are converted into the addresses on the VRAM, and further the addresses of the displayed part of the straight lines connecting the reference points are calculated. Then, the step 108 writes these data on the VRAM. Since the VRAM has already a map without any roads written thereon with the image pattern data, the road data are written over them. In this way, a complete map is displayed on the CRT display 5 by the display controller 4b.

The process then is passed to the step 102 again to repeat similar operations. If there is no input from the operating section 2 at the step 102, the display state mentioned above is kept on.

In the flowchart mentioned above, an example of detailed process corresponding to the steps 104 and 105 will be described below with reference to the flowchart shown in FIG. 5(a).

First, the step 150 determines the display size m from the input result of the menu. If Kariya City is selected in the menu input, for instance, as shown in FIG. 3(b), Chubu District is first selected from the district menu, then the first Aichi Prefecture from the prefectural menu, and then the second Kariya City from the city menu. The selection number for each menu is stored with the variable P(m) of the RAM 4a3. The FIG. 1 is set to the variable p(0) of the district menu, 1 to the variable P(1) of the prefectural menu, and 2 to the variable P(2) of the city menu. If the selection is made up to the smallest area, a figure is set up to P(5), and the size m is given as 5. Since the selection is made actually up to the city menu of P(2), however, the size m is given as 2.

Then, at the step 152, the address stored at the (m+1)th pointer is set to the variable Ad among the pointers 13a indicating the leading address of the size.

Then, the step 154 clears the counter S, followed by the step 156 where it is decided whether or not S coincides with m. Since m is 2, the decision is NO, followed by the execution of step 158. In view of the fact that the P(S)-th pointer among the pointers stored from the address Ad is given as P(S)=P(0), the address indicated by the first pointer is set to Ad. Specifically, the leading address of the data of Chubu District is set to Ad.

Next, the step 160 increments S to 1.

Then, the process is returned to the step 156 to determine whether or not S=m. Since S=1 and m=2, the decision is NO, and the step 158 is executed again. Of all the pointers stored from the address Ad, the P(S)-th one, that is, P(S)=P(1)=1, and therefore, the address indicated at the first pointer is set to Ad. In other words, the leading address of the data of Aichi Prefecture is set to Ad.

The process is then returned to the step 156 to decide whether or not S=m. Since S=2 and m=2, the decision is YES, followed by the execution of the step 162. Of all the pointers stored from the address Ad, the P(S)-th one, that is, P(S)=P(2)=2, and therefore a picture of data is read from the address indicated at the second pointer and written in the VRAM. In this way, the screen of the background is displayed by an image pattern of the area selected by the menu.

If m=5, the decision NO is repeated at the step 156 further, and the smallest area is displayed.

Next, in the above-mentioned flowchart, an example of the detailed process corresponding to the steps 106 to 108 will be explained with reference to the general flowchart shown in FIG. 5(b).

The step 201 is executed to read out the content of the leading pointer 29-1 in the route data string 23 of the map data memory unit 3.

Then, the step 202 is performed to decide whether or not the content of 29-1 to 29-N has all been read out.

At this time point, the content of the leading pointer 29-1 has just been read out, and the decision is NO, so that the step 203 is executed next.

The step 203 reads out the route level data of the i-th route data string (first route data string 28-1) designated by the i-th pointer (the leading pointer 29-1 at this time point). In this process, the route level data is the relative degree of importance assigned to each route.

Then, the step 204 is executed to decide whether or not the route level is displayable, that is to say, whether the i-th route (first route) has the degree of importance to be displayed against the size designated as aboYe.

If the i-th route (first route) is the one that need not be displayed, the step 205 is executed to update the pointer, that is to say, the next pointer (second pointer 29-2) is read and the process is returned to the step 202.

If the i-th route (first route) is the one to be displayed, on the other hand, the step 206 is executed to read the route type data of the i-th route data string (first route data string 28-1).

Next, the step 207 is executed to read out the point number data (the leading point number data at this time point) of the i-th route data string (first route data string 28-1).

Then, the step 208 is executed, and it is decided whether or not the route end data of the i-th route data string (first route data string 28-1) has been read or not.

At this time, the leading point number data has just been read out, and therefore the decision is NO, so that the next step 209 is executed to read out the point level data assigned to the point number in the point data string 22 coincident with the particular point number (leading point number), thus determining whether or not the particular point has the degree of importance worth displaying against the size designated as above. The above-mentioned point level data is already selected from the input of the menu in the step 103 shown in FIG. 4.

If this point need not be displayed, the process is returned to the step 207 to read the next point number in the i-th route data string (first route data string 28-1).

If this point is the one to be displayed, by contrast, the step 210 is executed to decide whether or not it is the first point number extracted in the i-th route data string (first route data string 28-1).

Since the first point number is involved at this time point, the decision is YES, and the steps 211 to 214 are executed to read out the X and Y components of the geographical coordinate of this point. This geographical coordiante point (X, Y) is converted into the display coordinate point ($X_1$, $Y_1$) and further the area A is determined which the display coordinate point ($X_1$, $Y_1$) belongs to.

Figure 6A:
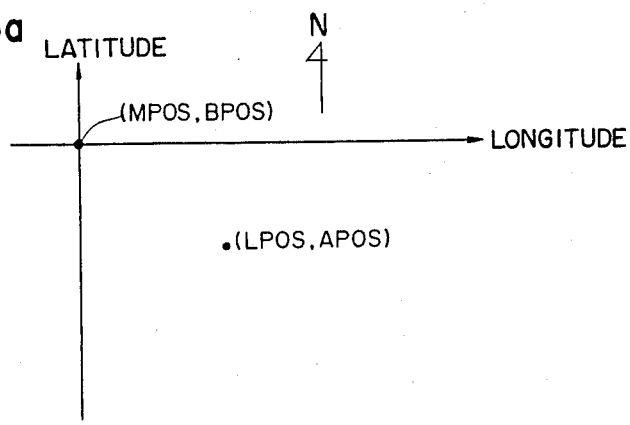
FIGS. 6(a) and 6(b) are diagrams for explaining the conversion from the geographic coordinate system into the display coordinate system.
Figure 6B:
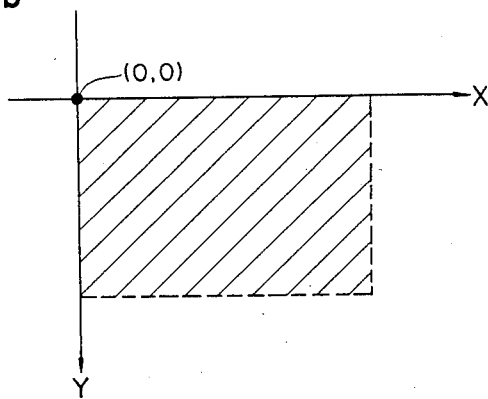

This coordinate conversion processing is such that, as shown in FIG. 6(a) showing the geographical coordinate system and FIG. 6(b) showing the display coordinate system, (1) the point (MPOS, BPOS) is obtained which corresponds to the geographical coordinates of the geographical coordinate system having one-to-one correspondence to the origin (0, 0) of the hatched area of the display coordinate system (corresponding to the map display area of the display 5), and then (2) in accordance with the obtained point (MPOS, BPOS) the geographical coordinates (LPOS, APOS) of the point in question are converted to the corresponding point ($X_1$, $Y_1$) of the display coordinate system.

Figure 7A:
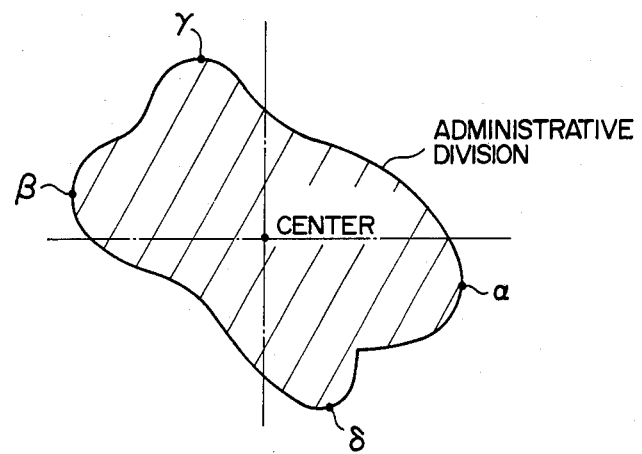
FIGS. 7(a) and 7(b) are diagrams for explaining a geographic coordinate (MPOS, BPOS) corresponding to the origin (0, 0) of the map display screen.
Figure 7B:
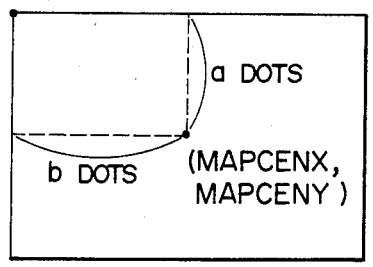

In this case, the point (MPOS, BPOS) is obtained in the following way. Firstly, the present position or the center point (FIG. 7(a)) of an administrative division point group in the case of an administrative division selection, is determined as the displayed map center coordinates (MAPCENX, MAPCENY) of the geographical coordinate system and then the point (MPOS, BPOS) is obtained from the following equations using as parameters the coordinate information MAPCENX and MAPCENY, the numbers of dots a and b of the map display screen of the display 5 (FIG. 7(b)) and the number of dots LDOT per unit longitude and the number of dots ADOT per unit latitude which are determined in accordance with the selected size MPOS = MAPCENX − b/LDOT BPOS = MAPCENY + a/ADOT Then, the point (X, Y) is determined by the following equations $X_1$ = (L POS − MPOS) × LDOT $Y_1$ = (BPOS − APOS) × ADOT By the way, the coordinate of the central point of the map designating an administrative section in FIG. 7(a) is obtained by the equations below from the geographical coordinate of the four points (α, β, γ, δ) including the east, west, north and south ends of the administrative section.

MAPCENX = (Longitude of east end − Longitude of west end)/2

MAPCENY = (Latitude of north end − Latitude of south end)/2

Figures 8A, 8B:
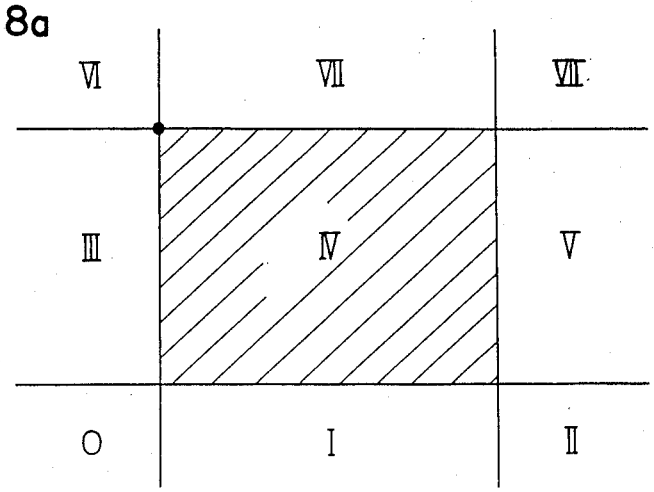
FIGS. 8(a) and 8(b) are diagrams for explaining the conditions for connection of two points on the display coordinate system.

On the other hand, the above-mentioned area determination processing is performed by determining that the display coordinate point ($X_1$, $Y_1$) obtained by the previously mentioned coordinate conversion process belongs to one of the areas 0 to VIII divided as shown in FIG. 8(a). In the case of FIG. 8(a), the area IV corresponds to the hatched area shown in FIG. 6(b) or the map display area.

When the area A to which the display coordinate point ($X_1$, $Y_1$) belongs is obtained at the step 214, a return is made to the step 207 and the next point number of the i-th route data string (the first route data string 28-1) is read out.

Then, the step 208 is performed to determine whether the route is ended. If it is not, then the step 209 is performed to determine whether the point level of this point number is a display enable level. If it is not, then a return is made to the step 207. If it is the display enable level, then the step 210 is performed to determine whether this point number is the one extracted for the first time for the i-th route data string (the first route data string 28-1).

Since the first point number has already been extracted by this time, the decision results in NO and then steps 215 to 218 are performed in this order thereby performing the similar process as the steps 211 to 214. In other words, the geographical coordinates (X, Y) of this point number (the j-th point number) are converted to the corresponding display coordinates ($X_2$, $Y_2$) and an area B to which the display coordinates ($X_2$, $Y_2$) belong is determined.

Then, a step 219 is performed to make a decision as to whether the connection between the point ($X_1$, $Y_1$) and the point ($X_2$, $Y_2$) is to be displayed, that is, whether there is a specified relation between the areas A and B. As will be seen from FIGS. 8(a) and 8(b), if, for example, the display coordinates ($X_1$, $Y_1$) belong to the area 0 and the other display coordinates ($X_2$, $Y_2$) belong to any one of the areas 0, I, II, III and VI, the decision process determines that there is no specified relation (this is indicated by a mark X in FIG. 8(b)). If the display coordinates ($X_1$, $Y_1$) belong to the area 0 and the other display coordinates ($X_2$, $Y_2$) belong to any one of the areas IV, V, VII and VIII, then it is determined that there is the specified relation (this is indicated by a mark O in FIG. 8(b)). The decisions on the other combinations become as shown in FIG. 8(b).

If there is no specified relation between the areas A and B, then steps 220 and 221 are performed so that an area updating process of changing the area A to the area B and a coordinate updating process of changing the coordinates ($X_1$, $Y_1$) to the coordinates ($X_2$, $Y_2$) are performed and a return is made to the step 107.

On the other hand, if the specified relation, exists then a step 222 is performed so that the line connecting the point ($X_1$, $Y_1$) and the point ($X_2$, $Y_2$) is displayed on the display screen in accordance with the type of the route. In other words, if the i-th route (the first route) is a national road, the route is displayed with an increased brightness as compared with the other routes. Then, the steps 220 and 221 are performed to effect the area updating process and the coordinate updating process and a return is made to the step 207.

Thereafter, so long as the end of route is not read out, the route including the steps 207, 208 and 209 or the route including the steps 207, 208, 209, 210 and 215 to 222 (the step 222 is omitted as occasion demands) is selectively performed thus making the required route displays for the i-th route (the first route).

When the end of route is read out for the i-th route (the first route) so that the decision of the step 208 changes to YES, the step 205 is performed and the pointer updating processing is performed. Thus, the processing for the next route (the second route) is performed in the like manner as in the case of the first route.

Thereafter, the same processing as mentioned above is successively performed for each of the route data strings so that when the processing of the N-th information string 28-N is completed, it is determined at the step 202 that the contents of all the pointers have been read out and the processing shown in FIG. 5(b) is ended.

From the foregoing description, it will be seen that when the control unit 4 receives commands (designations) from selecting means, e.g., the control panel 2, those points having the corresponding levels to the commands are extracted from the routes of the route data strings in the map data memory 3 which have those levels corresponding to the commands and the extracted points are subjected to the coordinate conversion thus determining the presence of a specified relation between the adjacent points and thereby displaying the connection between the points having the specified relation with a brightness corresponding to the type of the route.

In the above-mentioned construction, the relationship between the level data in the map data on the map data memory unit 3 and the size m set by the key operation is shown in Table (A) below.

TABLE (A)

| Scale | 1/1000000 | 1/500000 | 1/200000 | 1/100000 | 1/50000 | 1/25000 |
|---|---|---|---|---|---|---|
| Size m | 0 | 1 | 2 | 3 | 4 | 5 |
| Displayable level | 0 | 0, 1 | 0, 1, 2 | 0, 1, 2, 3 | 0, 1, 2, 3, 4 | 0, 1, 2, 3, 4, 5 |

Specifically, when a size corresponding to the scale of one millionth is set, only the routes and the points assigned with 0 as level data are selected as objects to be displayed on the CRT display 5. If the size 1 corresponding to the scale of one 500 thousandth, on the other hand, only those routes and points 0 or 1 in level data are selected as objects of display. The relationship between other sizes and display objects is also the same.

Normally, the relationship between the size and level is obtained as shown in Table (A). When the coarse key or the dense key is operated, however, the relationship between them for each key operation is updated as shown in Tables (B) and (C) below. Table (B) shows the case of the dense key operated once in each situation.

TABLE (B)

| Size m | 0 | 1 | 2 | 3 | 4 | 5 |
|---|---|---|---|---|---|---|
| Displayable level | 0 | 0 | 0, 1 | 0, 1, 2 | 0, 1, 2, 3 | 0, 1, 2, 3, 4 |

TABLE (C)

| Size m | 0 | 1 | 2 | 3 | 4 | 5 |
|---|---|---|---|---|---|---|
| Displayable level | 0, 1 | 0, 1, 2 | 0, 1, 2, 3 | 0, 1, 2, 3, 4 | 0, 1, 2, 3, 4, 5 | 0, 1, 2, 3, 4, 5 |

Specifically, in the case where a map corresponding to the size 3 is presently displayed, assume that the coarse key is operated once. The object of display which thus far been the points or routes having level 0, 1, 2 or 3 change to the points or routes having the level 0, 1 or 2, with the result that the points or routes of level 3 are omitted from the display objects, thereby making the displayed map coarse. Similarly, in the case where a map designated as size 3 is displayed, assume that the dense key is operated once. The points or routes or level 4 are newly added as display objects, thereby making the map dense.

Figure 4:
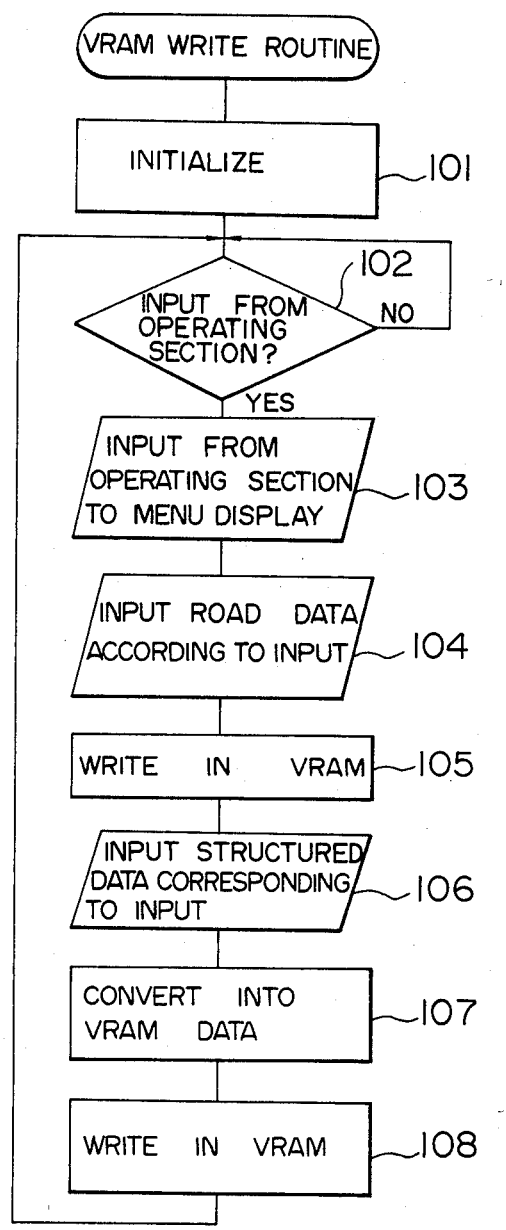
FIG. 4 is a basic flowchart for the control effected in the aforementioned embodiment.
Figure 5A:
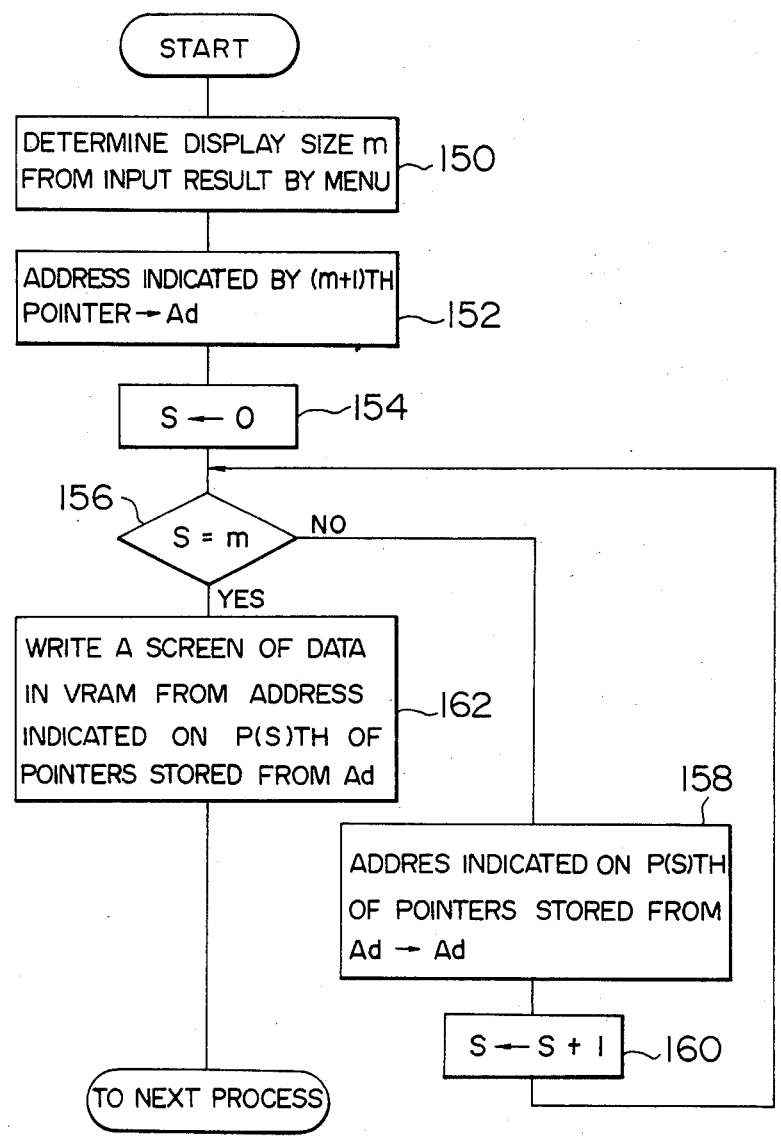
FIG. 5(a) is a flowchart for selecting required data from a part of the image pattern data strings.
Figures 1, 5B:
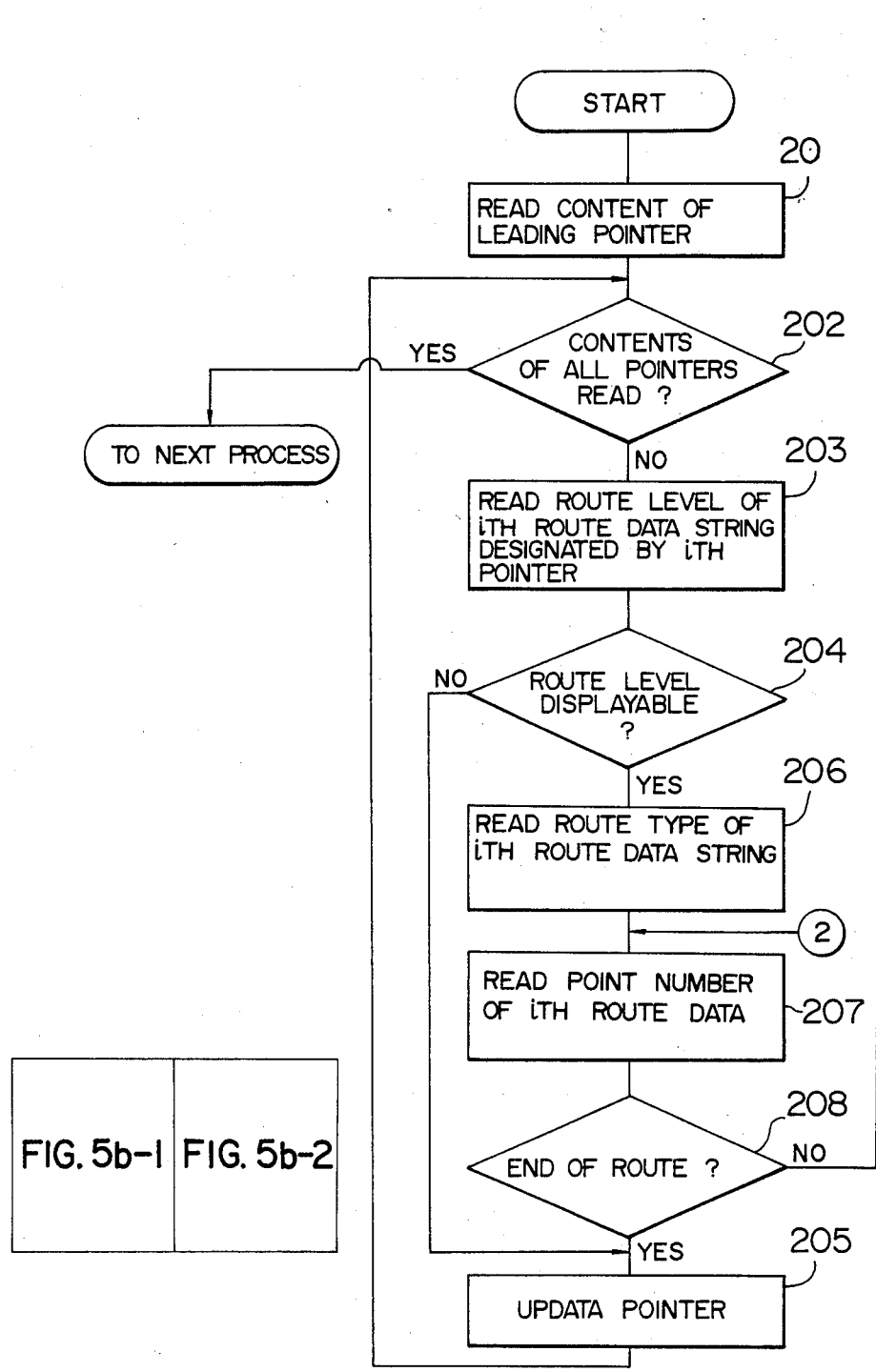
Figures 2, 5B:
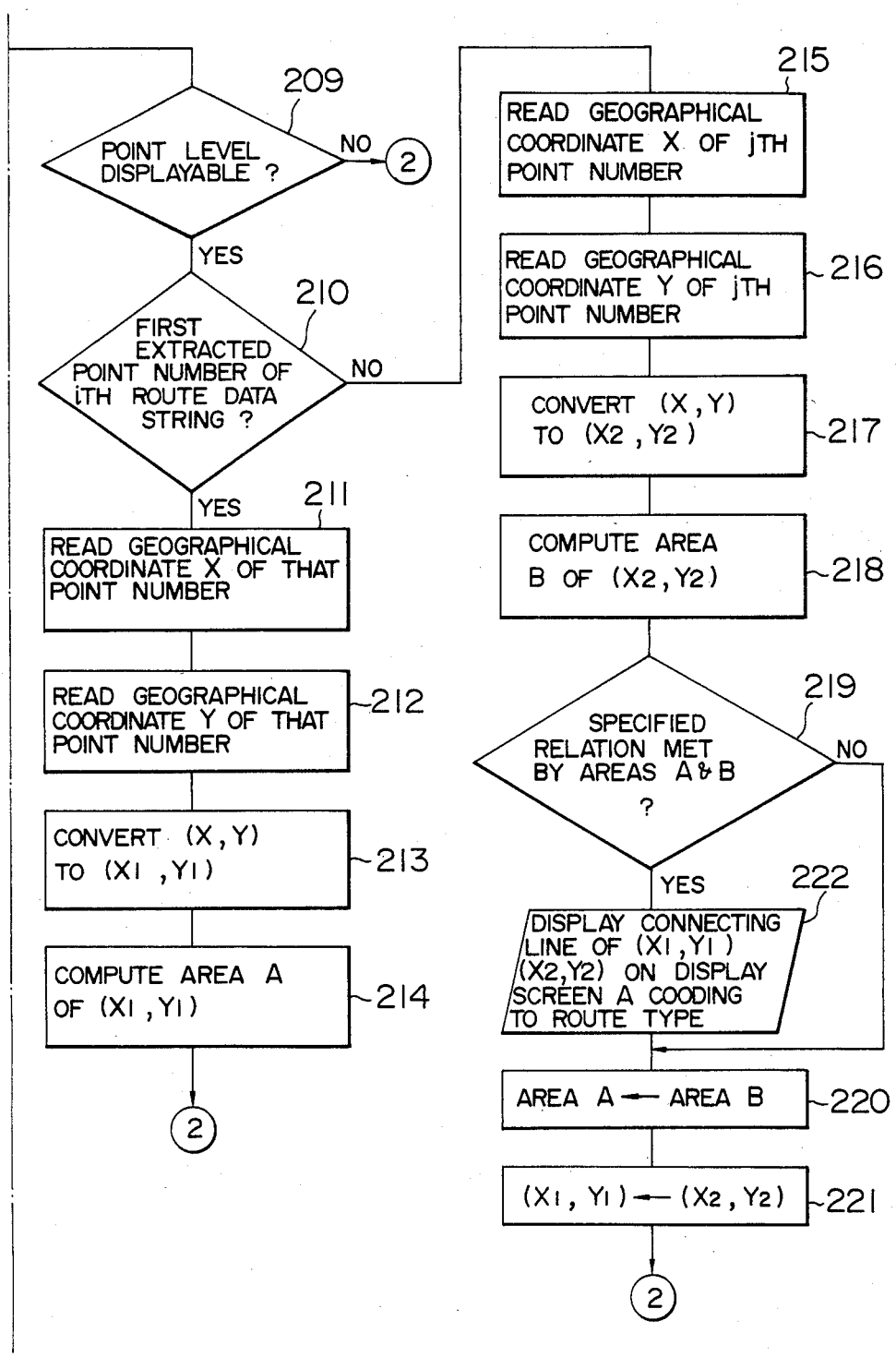

Although in the process of FIGS. 4 and 5(a), 5(b), the size is automatically determined, it may be directly designated by the enlargement or reduction key.

The example of display form of the CRT display 5 will be explained with reference to FIGS. 9(a) to FIG. 12(d).

(1) First, as a basic example, a display screen of the CRT display 5 is shown in FIGS. 9(a) and 9(b).

When the map of an area to be displayed and the size thereof are designated by the key operation of the operator or the internal processing of the control unit 4, the particular data is read out of the image pattern data D1, and a screen as shown in FIG. 9(a) is displayed for a moment on the CRT display 5. The map excluding roads is displayed, including the administrative boundary 301, the down town 302, the golfing course 303, and the like. The curvature of each boundary line, however, is stored with a low resolution. As a result, a polygonal display bent at right angle is obtained.

Then, the corresponding data is read out of the structured data D2, and as shown in FIG. 9(b), the display of the main road 304 is superimposed on the display of the image pattern. The display of the road 304 is plotted smoothly with a high resolution. The reason why the image pattern data D1 is displayed with low resolution is to visually achieve a definite distinction between the road 304 important for vehicle traffic and the administrative boundary 301, etc.

Figure 10A:
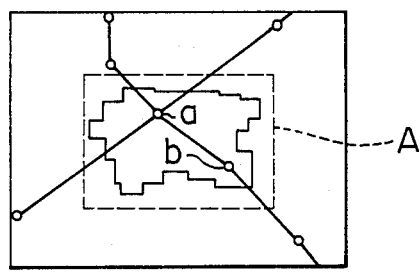
FIGS. 10(a), (b) and (c) are diagrams for explaining enlargement and reduction of the screen.
Figure 10B:
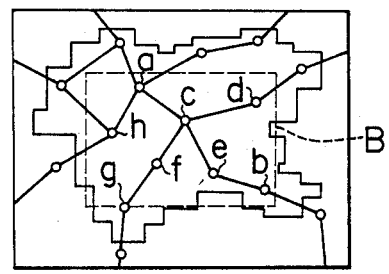
Figure 10C:
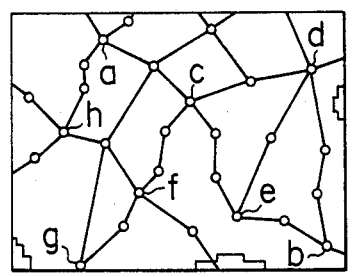

(2) Next, as an example of an enlargement process, a display screen of the CRT display 5 is shown in FIGS. 10(a) to 10(c).

Assume that enlargement of the display map is designated by the key operation of the operator or by the internal process of the control unit 4. If a map as shown in FIG. 10(a) is on display in a manner similar to FIGS. 9(a) and 9(b), the control unit 4 executes the enlargement processing about the area A surrounded by the dashed line in FIG. 10(a), so that the map on the screen of the CRT display 5 is comparatively detailed as shown in, say, FIG. 10(b). After that, upon a designation of further enlargement, the enlargement processing about the area B surrounded by the dashed line in FIG. 10(b) is executed, so that a more detailed map as shown in FIG. 10(c) is displayed on the screen of the CRT display unit 5. By the way, the points a and b in FIG. 10(a) represent the same geographic points as the points a and b in FIG. 10(b), while the points a to h in FIG. 10(b) the same geographic points as the points a to h in FIG. 10(c).

When the reduction of a map on display is designated, on the other hand, the transfer of display form opposite to the one for the enlargement mentioned above is effected. Specifically, the displayed map of FIG. 10(c) is changed to the one shown in FIG. 10(b) and further to the one shown in FIG. 10(a).

In this enlargement process, the image pattern data prepared for the areas A and B by the process of the step 140 in FIG. 4 is read from the optical disc and written in the VRAM. The structured data of the roads, on the other hand, with the data lower in level added to the same data, and the scale of the coordinate system converted into the one for enlargement, is written on the VRAM over the image pattern data.

In the case of reduction, the process reverse to the one mentioned above is taken. The image pattern is wholly converted into the data representing a larger area. The structured data lower in level is dropped, and the scale of the coordinate system is converted to the one for reduction, so that the data is written on the VRAM over the image pattern data.

Figure 11A:
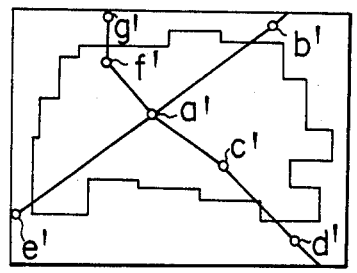
FIGS. 11(a), (b) and (c) are diagrams for explaining the screen for each density of the structured data thereof.
Figure 11B:
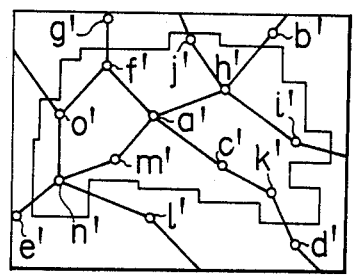
Figure 11C:
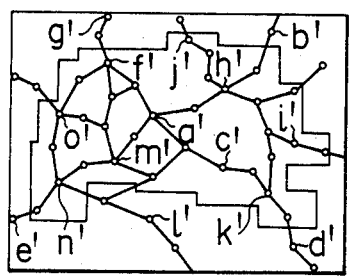

(3) Then, as an example of the case in which the display density of a road is changed with the same size, a display screen of the CRT display 5 is shown in FIG. 11(a) to FIG. 11(c).

Assume that a dense display map is designated by the key operation of the operator or the internal processing of the control unit 4. If a map as shown in FIG. 11(a) is on display, the processing for making the map dense is executed by the control unit 4, so that a comparatively dense map as shown in FIG. 11(b) is displayed on the CRT display 5. Upon subsequent designation of a dense map, a further process for a denser map is executed, and a more detailed map as shown in FIG. 11(c) is displayed by such a processing. The points a' to g' in FIG. 11(a) represent the same geographic points as the points a' to g' in FIG. 11(b), and the points a' to o' in FIG. 11(b) the same geographic points as the points a' to o' in FIG. 11(c).

When a coarse map is designated, by contrast, the transfer opposite to the one for the display form for a dense map as mentioned above is executed. Specifically, the displayed map of FIG. 11(a) is changed to the one of FIG. 11(b), and further to the display map of FIG. 11(a).

In this dense-map processing, the same image pattern data is used each time, and only the structured data of the roads is read with a changed level, and written in the VRAM over the image pattern data. If there are provided two VRAMs for the image pattern data and the structured data so that the two VRAMs are displayed at the same time on the CRT display 5 by the CRT controller 4b, it is not necessary to rewrite the VRAMs for the image pattern data in the dense-map processing.

As described above, according to the present embodiment, the road data are stored in structured form and the other background data in the form of image pattern data. As a result, the road display form is changed variously with a small amount of data according to the requirement of the driver. At the same time, the background, which is the image pattern data, can be directly written in the VRAM for display without any computation process, thus making rapid display possible.

Further, data which otherwise might be difficult to process in the form of structured data including the coloring of the background can be easily processed with the image pattern data, and therefore rapid display is made possible.

Figure 12A:
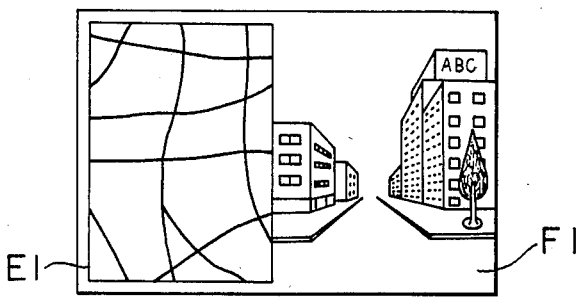
FIG. 12(a) is a diagram for explaining a screen using an image of an actual place as the image pattern data.

Furthermore, the image pattern data can be prepared easily by digitizing the analog data by use of an image pick-up tube, so that an actual building or an establishment may be added to the display of the background, which provides an easily identifiable mark for the driver. As shown in FIG. 12(a), for instance, the cursor of arrow on the road map E1 prepared from the structured data on the left side is moved by the designation key to designate an intersection. In this way, the image of the intersection from all the directions are displayed successively on the screen F1 prepared from the image pattern data on the right side. If a direction sensor is mounted on the automobile, on the other hand, the screen of intersections along the direction of the drive of the automobile are capable of being displayed.

Figure 12B:
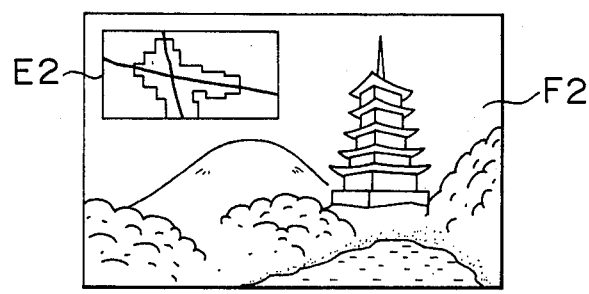
FIGS. 12(b), (c) and (d) are diagrams for explaining screens displaying various types of image as a video signal other than a map.
Figure 12C:
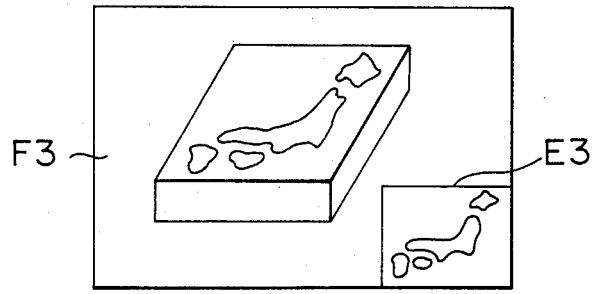
Figure 12D:
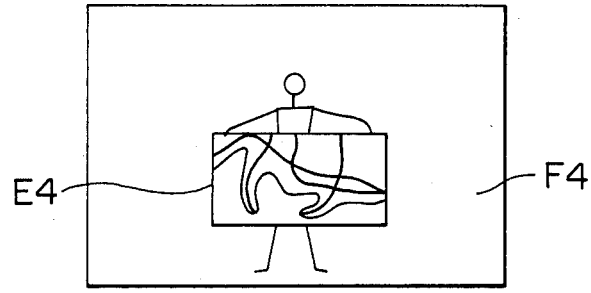

As another example, as shown in FIG. 13, a video tape recorder VTR 6 is provided and the signal, after being A/D converted, is combined at the CRT controller 4b, so that the ordinary map portion E2 and the introduction video screen F2 for the particular area may be displayed as shown in FIG. 12(b). A further similar example is shown in FIG. 12(c), in which the ordinary map portion E3 is displayed together with the three-dimensional picture F3 thereof obtained from the VTR 6, or as shown in FIG. 12(d), the ordinary map portion E4 is displayed together with the modification part F4 surrounding them obtained from the VTR 6.

What is claimed is:

1. An electronic map display system for displaying a map on the basis of map data stored therein, comprising:
    structured data memory means for storing structured data having discontinuous points which indicate ponts on a road in each of a plurality of predetermined areas of said map;
    pattern data memory means for storing pattern data which indicates geographic images in each of said predetermined areas;
    display selection means for producing a selection signal for selecting an area to be displayed from one of said plurality of predetermined areas;
    display control means, responsive to said selection signal and coupled to said pattern data memory means and structured data memory means for generatig a display signal based on both of a pattern data corresponding to said area to be displayed from said pattern data memory means and structured data corresponding to said predetermined area to be displayed from said structured data memory means; and
    display means for displaying a map of said area to be displayed on the basis of said display signal of said display control means.

2. An electronic map display system according to claim 1, wherein said structured data memory means is also for storing structured data which indicates the geographic coordinate components of various points in said predetermined areas.

3. An electronic map display system according to claim 1, wherein said structured data memory means is also for storing display level data representing a degree of importance of the respective points which are displayed in said predetermined area.

4. An electronic map display system according to claim 1, wherein said pattern data memory means is also for storing the predetermined areas arranged by the size of the scale of display.

5. An electronic map display system according to claim 3, wherein said display control means determines a display level of display level data stored in said structured data memory means and a display size of the areas stored in the pattern data memory means, in accordance with the selection signal.

* * * * *